Jan. 7, 1964  R. V. RULE  3,116,894
LINE CONTROL FOR SPINNING REELS
Filed July 20, 1962
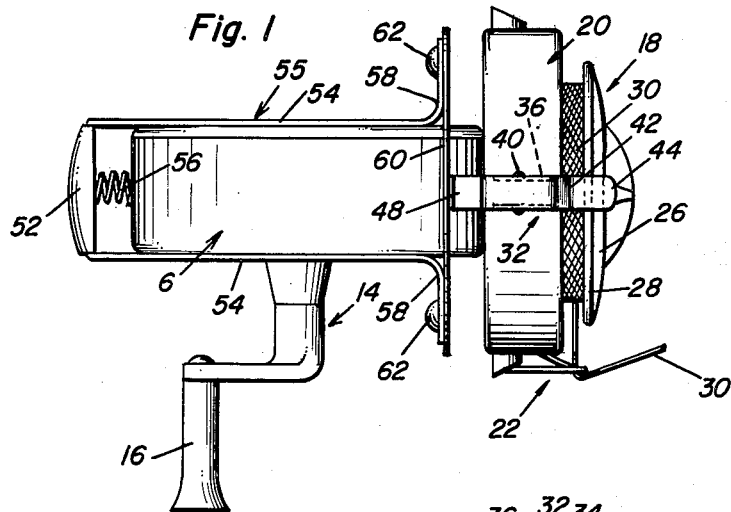
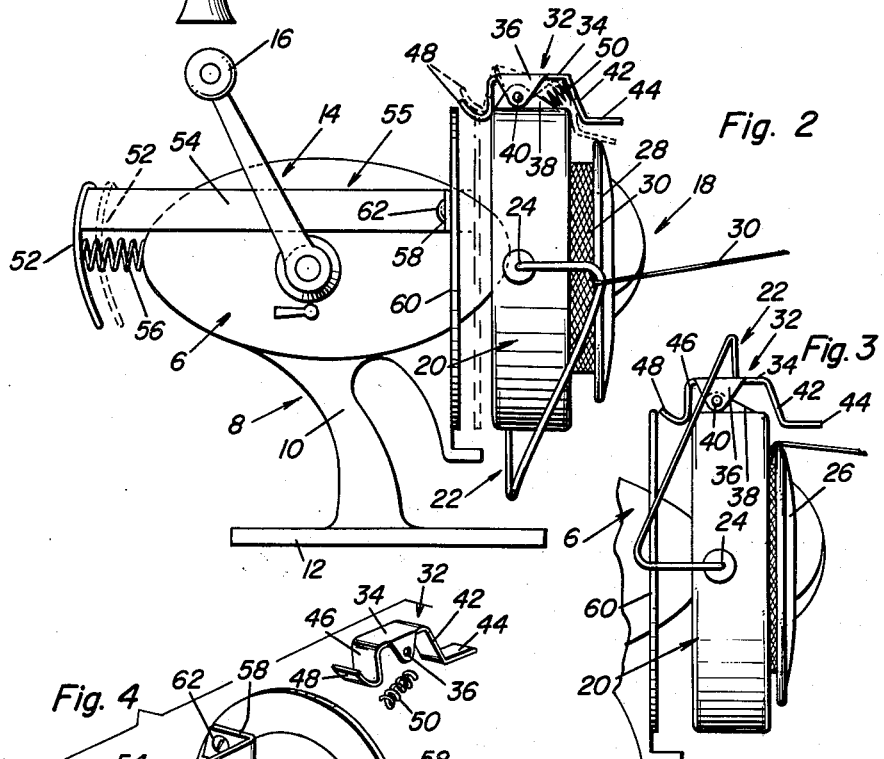
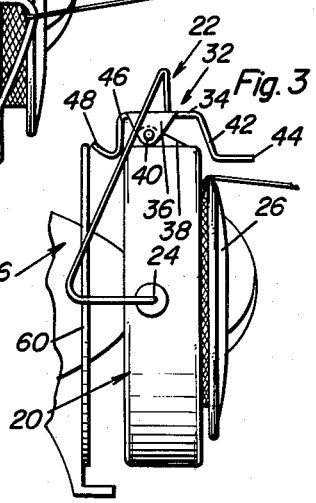
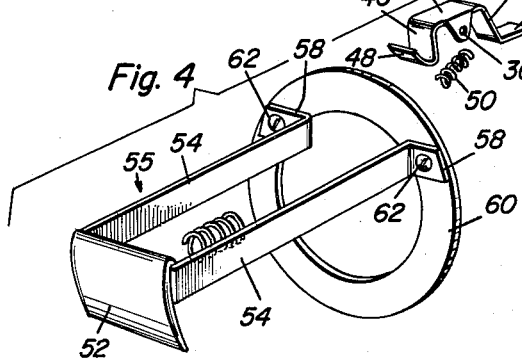
Ray V. Rule
INVENTOR.

United States Patent Office 3,116,894
Patented Jan. 7, 1964

3,116,894
LINE CONTROL FOR SPINNING REELS
Ray V. Rule, 106 Huron Ave., Harrisville, Mich.
Filed July 20, 1962, Ser. No. 211,310
3 Claims. (Cl. 242—84.2)

The present invention relates to an improved spinning reel from which the cast line peels off in a well known manner and pertains, more particularly, to novel attachment means which is such in construction that it is expressly designed and constructed to control the paying out of the fishing line at the time the cast is made.

Two types of spinning reels are being marketed; namely, an open-face spinning reel, and a side-exit spinning reel. In reels in this category the line whirls off the spool as long as the lure on the line is in motion. The line stops unwinding when the lure comes to a stop. Closed-face reels are advocated by anglers in that they are constructed to cope with and guard against backlash. These types of reels are not particularly desirable, it is submitted, because they employ a stationary spool, which is troublesome. When the line is being retrieved the windings or convolutions pile up in one place between the spool heads, are subject to entanglement, and in many instances present resistance when the next cast is undertaken. Apparently the open-face reel is preferred by many fishermen because the line rarely becomes snarled and it is almost invariably free to unwind when making a cast. Then, too, the spool can be changed readily and with a minimum amount of time and effort. On the other hand, it is noted that the open-face reel is suspended from the underneath side of the rod, the line must be held in some manner with the fingers for casting and this procedure necessitates moving the hand forward in relation to the reel thus running the risk of throwing the rod out of balance. Then, too, when the line has to be retrieved by the turning crank the latter is usually operable by the left hand in a somewhat awkward manner.

As will be evident upon examining the views of the drawing in the accompanying application for patent the component parts which go to make up the invention in an overall or united sense lend themselves appropriate to practical and feasible use on an open-face reel. In connection with this construction it will be evident that the spool does not rotate in accepting the retrieved line. In fact, it moves in and out or reciprocates in such a manner as to evenly rewind or spool the line on the periphery between the heads. A revolving cup turns around the spool to place the line back on it. As a matter of fact the spinning reel's spool revolves only when the pull of a fighting fish exceeds the braking action of the built-in drag means. In carrying out the principles of the present invention a simple mechanical finger is hinged or pivotally mounted intermediate its ends on the periphery of the aforementioned cup with the finger proper extending crosswise of the line spooling space of the spool, the other end of the finger being fashioned into an actuating element.

More particularly the present invention pertains to a pivotally mounted lever-like unit one end of which is fashioned into a line-controlling finger which is directly cooperable with the wound line on the reel, the other end being fashioned into a cam, said cam being tripped by the marginal edge of a ring and said ring being mounted on and carried by a slidingly shiftable spring-returned yoke or frame suitably mounted for operative use on the gear housing.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a top plan view of an open-face, crosswind spinning reel construction equipped with the improved line-controlled finger and pushbutton operating means therefor;

FIGURE 2 is a view in side elevation of the structural assemblage seen in FIGURE 1;

FIGURE 3 is a fragmentary elevational view showing the spool retracted into the bail-carrying cup with the bail in an up position and the line-controlling finger disengaged from the spool;

FIGURE 4 is an exploded perspective view of the component parts which go to make up the overall line-control means.

The open-face cross-wind spinning reel construction shown in FIGS. 1 and 2 comprises an elongated elliptical or equivalent gear housing which is denoted generally by the numeral 6 and is provided on its bottom side with an attaching bracket 8 having a depending leg 10 and a mounting and attaching foot 12. In practice these parts are constructed for attachment to a portion of a conventional fishing rod, not shown. The crank is denoted at 14 and includes a handle or handgrip 16. The spool is denoted generally at 18, the revolvable spool cup is denoted at 20 and the line pickup mechanism or bail is denoted at 22, the same being hinged on the cup on diametrically opposite sides as at 24 and movable to either of the positions shown, for example, in FIGURES 2 and 3. The head of the spool with which we are here concerned is denoted at 26 and the marginal edge or periphery thereof at 28. The fishing line is designated at 30, the same being shown crosswound on the spool between the usual heads in the manner illustrated.

The lever-like line-control device is denoted as an entity by the numeral 32, the same comprising a body portion 34 having spaced parallel depending lugs or ears 36 straddling a radial outstanding attachment member 38. These lugs or ears are triangular in form and the apical end portions are pivoted in place as at 40. The right-hand end portion of the lever is bent laterally at an oblique angle as at 42 and terminates in a further laterally bent end portion 44 which constitutes the finger proper. The finger is of relatively broad rigid sheet material and is angled and positioned so that it is shiftable toward and from the peripheral edge portion 28 as shown in full and dotted lines in FIG. 2. The opposite end portion of the lever unit is bent laterally and downwardly as at 46 and has an upturned end portion which constitutes a cam 48. The accompanying coil spring 50 is located between the component parts 38 and 42 and exerts diagonal pressure on the unit 32 as an entity to force the finger up and away from the edge portion 28 of the spool head 26. Therefore, the released or open position of the finger is shown in full lines in FIGS. 2 and 3. The finger is tiltable toward the edge 28 and may be directly and positively engaged with the edge as shown in dotted lines in FIG. 2. It will be evident, therefore, that with the finger 44 normally released and held in this out-of-the-way position by the spring means 50, the presence of the device 32 on the cup 20 would be regarded as of no moment. When, however, the finger is pivoted and actuated to assume the dotted line position it accomplishes the desired line braking and controlling result.

The line controlling device 32 is indirectly operated by way of a pushbutton which is supported on the gear housing in the manner shown. More specifically the pushbutton comprises a simple properly located arcuate plate 52. The plate actually cositutes the bight portion of a U-shaped yoke whose arms are denoted at 54. This yoke can and may be mounted for shiftable operation in any one of a number of convenient ways. This is to say that the yoke is positioned so that the arms 54 straddle the opposite cooperating side faces of the elongated gear housing 6. These arms could be slidingly mounted in keying grooves (not shown) or in any equivalent manner that would be evident to persons skilled in the art. A coil spring 56 is provided and arranged between the button 52 and the adjacent end of the peripheral or rim portion of the housing. In actual practice the coil spring may be welded or otherwise securely attached at one end to the cooperating end portion of the gear housing or, alternatively, it may be attached at its other end to the plate 52 constituting the pushbutton. In fact, it is within the purview of the invention to attach both ends of the spring, one to the housing and the other to the pushbutton. The ends of the arms to the right in FIG. 4 are bent laterally as at 58 where they are screwed, riveted or otherwise fastened to diametrically opposite portions of a thrust ring or frame 60. Screws 62 may be employed to attach the ends 58 to the ring. The ring encircles the gear housing and is disposed in spaced parallelism to an adjacent face of the cup 20. Thus by slidably mounting the yoke 55 on the gear housing and properly locating the spring-returned button 52 and orienting the margin of the ring 60 with the cam element 48 the attachment is then in readiness to function in the desired manner. Assuming that the means 32 is in the full line position shown in FIG. 2 it will be evident that by exerting pressure on the thumbpiece or thumb button 52 and moving the same to the dotted line position shown in FIG. 2, the marginal edge of the ring 60 engages the cam surface of the element 48 which element serves to rock the lever means 32 on the pivot points and, at the same time, to swing the finger 44 into engagement with the marginal edge 28 of the spool head. When in the latter position the finger bridges the channel between the spool heads and blocks the line so that it will not whirl or peel off the spool.

In practice it will be obvious that the coil spring 56 serves to resist the movement of the pushbutton 52 and, in addition, keeps the pushbutton in its normal or ready-to-function position. The coil spring 50 functions in combination with the spring 56 and consequently the invention is characterized by two spring returned or spring loaded component units; namely, the slidingly mounted spring returned fingerpiece 52 and the mechanical finger return spring 50. Extending a mechanical finger transversely across the winding channel of the spool 18 and pivotally mounting the same on the periphery of the spool accommodating cup 20 appears to be novel particularly when considered in conjunction with the button-operated shiftable cam-actuating ring 60.

It is believed that a careful consideration of the specification taken in conjunction with the views of the drawing will enable the reader to obtain a clear and comprehensive understanding of the construction and arrangement of component parts, the features and advantages, and the manner of handling and using the invention. Consequently, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spinning reel comprising, in combination, a gear housing having means for mounting said housing on a fishing rod, a spool accommodating cup operatively mounted on said housing, a spool confined and operable in the receptacle portion of said cup and projectible and retractible in relation thereto, said spool embodying spaced cooperating heads joined and having a line accommodating and winding channel between said heads, a line retrieving and pickup bail hingedly mounted on said cup, a mechanical line controlling finger pivotally mounted on a peripheral portion of said cup and having a portion thereof spanning the channel of the spool and a tip portion movable toward and from and engageable with the marginal edge of one head of the spool, spring means cooperable with said finger and normally disengaging said finger from said marginal edge, operating means for said finger, said operating means comprising a ring encircling an end portion of the housing and opposed in spaced parallelism to a cooperating side surface of said cup, the periphery of said ring being engageable with a component part of said finger, a spring-returned pushbutton, and an operating connection between the pushbutton and ring.

2. The structure defined in claim 1 and wherein said operating connection comprises a yoke embodying a pair of opposed spaced parallel arms straddling and operatively cooperable with adjacent respective side portions of said gear housing and connected at like end portions with said pushbutton and connected at opposite end portions with said ring.

3. A fishing line and spool control attachment for a spinning reel comprising, in combination, a unit embodying a lever having means intermediate its ends for pivotally mounting said lever on a peripheral portion of a spinning spool accommodating cup, said lever having one end laterally bent and fashioned into a finger, said finger being designed and adapted to frictionally engage a cooperating marginal edge portion of the spool of said spinning reel, the opposite end of said lever being bent upon itself and fashioned into a cam, and manually controllable mechanical actuating means for said lever and consequently the finger and cam at the respective ends of said lever, said actuating means comprising a ring-like frame designed and adapted to embrace a portion of a spinning reel with which it is cooperable when in use, a pair of straight spaced parallel arms having like ends fixedly attached to a cooperating side of an upper portion of said frame, a plate joined to and connecting the opposite corresponding ends of said arms and cooperating therewith and defining an actuating yoke, said plate constituting a finger-piece and being provided on a side thereof with a coil spring.

References Cited in the file of this patent

UNITED STATES PATENTS

| | | |
|---|---|---|
| 2,586,921 | Delphon | Feb. 26, 1952 |
| 2,590,369 | Beeler | Mar. 25, 1952 |
| 2,648,505 | Mauborgne | Aug. 11, 1953 |
| 2,658,697 | Steinbaugh | Nov. 10, 1953 |
| 2,736,979 | Le Gal | Mar. 6, 1956 |